UNITED STATES PATENT OFFICE.

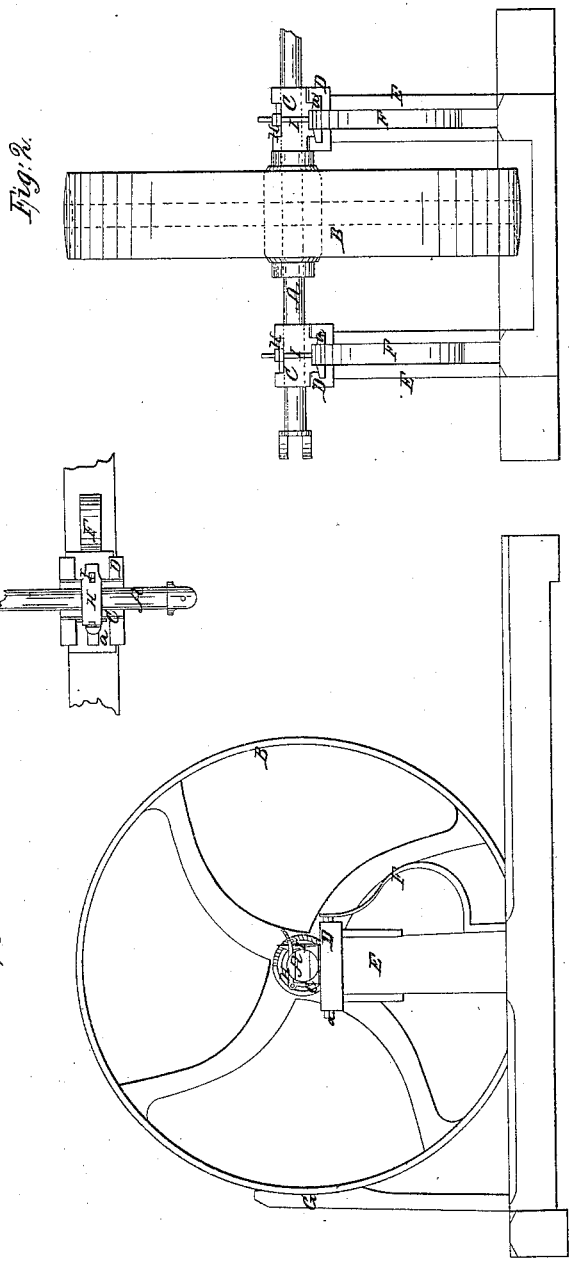

WM. F. RUNDELL, OF GENOA, NEW YORK.

IMPROVEMENT IN BRAKES FOR HORSE-POWERS.

Specification forming part of Letters Patent No. 50,277, dated October 3, 1865.

*To all whom it may concern:*

Be it known that I, WM. F. RUNDELL, of Genoa, in the county of Cayuga and State of New York, have invented a new and Improved Self-Acting Brake for Horse-Powers; and I do hereby declare that the following is a full, clear, and exact description thereof, which will enable those skilled in the art to make and use the same, reference being had to the accompanying drawings, forming part of this specification, in which—

Figure 1 is a side view of my invention; Fig. 2, a front view of the same; Fig. 3, a plan or tow view of a portion of the same.

Similar letters of reference indicate corresponding parts.

This invention consists in having the bearings of the driving-shaft of a horse-power arranged in such a manner that they will slide in a direction transversely with the shaft, and having springs or their equivalents connected with said bearings in such a manner that they will have a tendency to press the band-wheel, which is on the driving-shaft, in contact with the brake when the band is off from said wheel, the band when on the wheel keeping by its tension the wheel free from the brake, so that at any time when the band is cast off from the wheel the springs will throw the wheel in contact with the brake.

A represents the driving-shaft of a horse-power, and B, the band-wheel thereon. C C represent the bearings of the shaft A, which are provided with base-plates *a a*, the latter being fitted in sockets or guides D D on uprights E E. The base-plates *a a* are allowed to slide freely in the guides D D, and against one end of the base-plates *a a* springs F F bear, and these springs have a tendency to press the periphery of the band-wheel B against a brake, G, as will be fully understood by referring to Fig. 1. When the band is on the wheel B the tension of the former will keep the wheel free from the brake; but at any time when the band is cast off from the wheel the latter will, under the action of the springs F, be thrown in contact with the brake. Hence the machinery will be instantly stopped when the band is cast off from the band-wheel, the momentum of the moving parts being overcome by the friction of the brake against the periphery of the band-wheel.

The bearings C C are each provided with a hinged-plate, H, which when down are over the shaft A, and secure the same in its bearings, said plates being held down by means of spring-catches I. By this arrangement the shaft may be readily adjusted in and removed from its bearings.

Having thus described my invention, I claim as new and desire to secure by Letters Patent—

1. The placing of the driving-shaft of horse-powers in sliding bearings, acted upon by springs or their equivalents, in such a manner that the band-wheel on the driving-shaft will, when the band is cast off from it, be thrown in contact with a brake and the machinery at once stopped, the tension of the band when on the wheel keeping the latter free from the brake, substantially as set forth.

2. The hinged plates and spring-catches, applied to the bearings of the driving-shaft in the manner substantially as and for the purpose specified.

WM. F. RUNDELL.

Witnesses:
WM. A. CROPSEY,
S. B. HEWITT.